US012336958B2

(12) United States Patent
He et al.

(10) Patent No.: US 12,336,958 B2
(45) Date of Patent: Jun. 24, 2025

(54) NEGATIVE PRESSURE GENERATOR AND NEGATIVE PRESSURE MASSAGING DEVICE

(71) Applicant: SHENZHEN SVAKOM TECHNOLOGY CO., LTD, Shenzhen (CN)

(72) Inventors: Minchao He, Shenzhen (CN); Yong Yu, Shenzhen (CN); Guohui Zhang, Shenzhen (CN)

(73) Assignee: SHENZHEN SVAKOM TECHNOLOGY CO., LTD, Shenzhen (CN)

( * ) Notice: Subject to any disclaimer, the term of this patent is extended or adjusted under 35 U.S.C. 154(b) by 1007 days.

(21) Appl. No.: 17/382,363

(22) Filed: Jul. 22, 2021

(65) Prior Publication Data

US 2022/0409470 A1 Dec. 29, 2022

(30) Foreign Application Priority Data

Jun. 26, 2021 (CN) ......................... 202110715294.6

(51) Int. Cl.
*A61H 7/00* (2006.01)

(52) U.S. Cl.
CPC ..... *A61H 7/001* (2013.01); *A61H 2201/1246* (2013.01); *A61H 2201/1418* (2013.01)

(58) Field of Classification Search
CPC .................................................... A61H 9/0057
See application file for complete search history.

(56) References Cited

U.S. PATENT DOCUMENTS

| | | | | | |
|---|---|---|---|---|---|
| 2,154,428 | A * | 4/1939 | Andres | A61H 23/0218 601/81 |
| 5,478,310 | A * | 12/1995 | Dyson-Cantwell | A61M 35/30 604/23 |
| 10,314,762 | B1 * | 6/2019 | Marton | A61H 1/008 |
| 10,993,874 | B1 * | 5/2021 | Marton | A61H 1/00 |
| 2013/0133656 | A1 * | 5/2013 | Nightingale | A61M 16/0066 128/204.23 |
| 2015/0283026 | A1 * | 10/2015 | Rosenberg | A61H 9/0057 601/10 |
| 2017/0196762 | A1 * | 7/2017 | Antros | A61H 23/02 |

* cited by examiner

*Primary Examiner* — LaToya M Louis

(57) ABSTRACT

The negative pressure generator includes a chamber body with a suction nozzle; a piston, arranged inside the chamber body; and a driving device configured to drive the piston to reciprocated move inside the chamber body so as to generate negative pressure at the suction nozzle.

15 Claims, 16 Drawing Sheets

NEGATIVE PRESSURE GENERATOR AND NEGATIVE PRESSURE MASSAGING DEVICE

CROSS-REFERENCE TO RELATED APPLICATIONS

This application claims priority to Chinese Patent Application No. 202110715294.6 filed on Jun. 26, 2021, the contents of which are incorporated by reference herein.

FIELD

The subject matter herein generally relates to massaging devices, and particularly relates to a negative pressure generator and a negative pressure massaging device.

BACKGROUND

With acceleration of the pace of life, the pressure on people's work increases. After a day's work, the human body is very tired and aching. In order to relieve fatigue and soreness, people usually use a variety of massaging devices to massage the chamber body, such as negative pressure massaging devices. Negative pressure massaging devices soothe the chamber body and mind by suctioning and relaxing the skin to relieve fatigue and soreness. However, suctioning effect of existing negative pressure massaging devices is not good.

SUMMARY

The present disclosure provides a negative pressure generator and a negative pressure massaging device which can improve suctioning effect thereof.

An embodiment of the present disclosure provides a negative pressure generator. The negative pressure generator includes a chamber body with a suction nozzle; a piston, arranged inside the chamber body; and a driving device configured to drive the piston to reciprocated move inside the chamber body so as to generate negative pressure at the suction nozzle.

In at least one embodiment, the piston comprises a piston body and a sealing ring arranged between the chamber body and the piston body, the sealing ring surrounding the piston body and resists against between the piston body and the chamber body to ensure sealing performance.

In at least one embodiment, the piston body defines sealing slot configured to receive the sealing ring.

In at least one embodiment, the sealing ring includes an arc-shaped part and two fixing parts extending from two opposite sides of the arc-shaped part respectively, wherein the two fixing parts arranged at interval along a moving direction of the piston and extending toward the sealing ring, the arc-shaped part, the two fixing parts and the piston body cooperate to define a space, and the arc-shaped part is configured to be deformed into the space.

In at least one embodiment, the negative pressure generator further comprises a massaging member, the massaging member comprising a connecting part connected to a side of the piston body facing the suction nozzle, and at least one massaging part arranged on the connecting part away from the piston body and configured to partially extend out of the chamber body through the suction nozzle.

In at least one embodiment, the massaging member is integrally formed with the sealing ring, an outside edge of the connecting part is connected to the sealing ring.

In at least one embodiment, the piston separates the chamber body into a first chamber and a second chamber, the first chamber communicates with the suction nozzle, the piston further includes a unidirectional exhaust structure configured to communicate the first chamber with the second chamber unidirectionally.

In at least one embodiment, the unidirectional exhaust structure includes at least one exhaust hole extending through the piston body to communicate the first chamber with the second chamber, and a vent plug arranged on the piston body and configured to cover the at least one exhaust hole away from the first chamber.

In at least one embodiment, the vent plug includes a main part arranged on the piston body away from the suction nozzle, and at least one covering part made of elastic material which is capable of being deformed to cover or open the at least one exhaust hole.

In at least one embodiment, the vent plug includes a main part arranged on the piston body away from the suction nozzle, and at least one surrounding wall extending away from the main part, the main part defines at least one through hole communicating with the at least one exhaust hole, the at least one surrounding wall surrounds the at least one through hole respectively and is made of elastic material which is capable of being deformed to close or open the at least one through hole.

In at least one embodiment, the chamber body includes a rigid part with an opening and a flexible part, the piston is arranged inside the rigid part, the flexible part is connected to the rigid part at the opening and defines an air passage communicating with the opening, the suction nozzle is arranged on the flexible part away from the opening.

In at least one embodiment, the rigid part includes a first wall extending along a moving direction of the piston and a second wall arranged at an end of the first wall away from the opening, a transmission member extends through the second wall to connect the piston to the driving device.

In at least one embodiment, the second wall defines at least one vent hole extending therethrough.

In at least one embodiment, the negative pressure generator further includes a self-lubricating sleeve arranged between the transmission member and the second wall.

In at least one embodiment, the driving device includes a transmission part and a motor, the motor is connected to the transmission member through the transmission assembly, the transmission assembly is one of an eccentric structure, a cam and a ball screw.

In at least one embodiment, the transmission assembly includes an eccentric element and a connecting rod, the eccentric element is connected to the motor, and the connecting rod is hinged with the transmission member.

In at least one embodiment, the driving device is an electromagnetic motor.

In at least one embodiment, the negative pressure generator further includes a heating coil or a semiconductor refrigeration sheet arranged on the chamber body to adjust temperature at the suction nozzle.

An embodiment of the present disclosure provides a negative pressure massaging device. The negative pressure massaging device includes a housing; a chamber body with a suction nozzle and received in the housing; a piston, arranged inside the chamber body; and a driving device, configured to drive the piston to reciprocate inside the chamber body so as to generate negative pressure at the suction nozzle.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION

Figure 1:
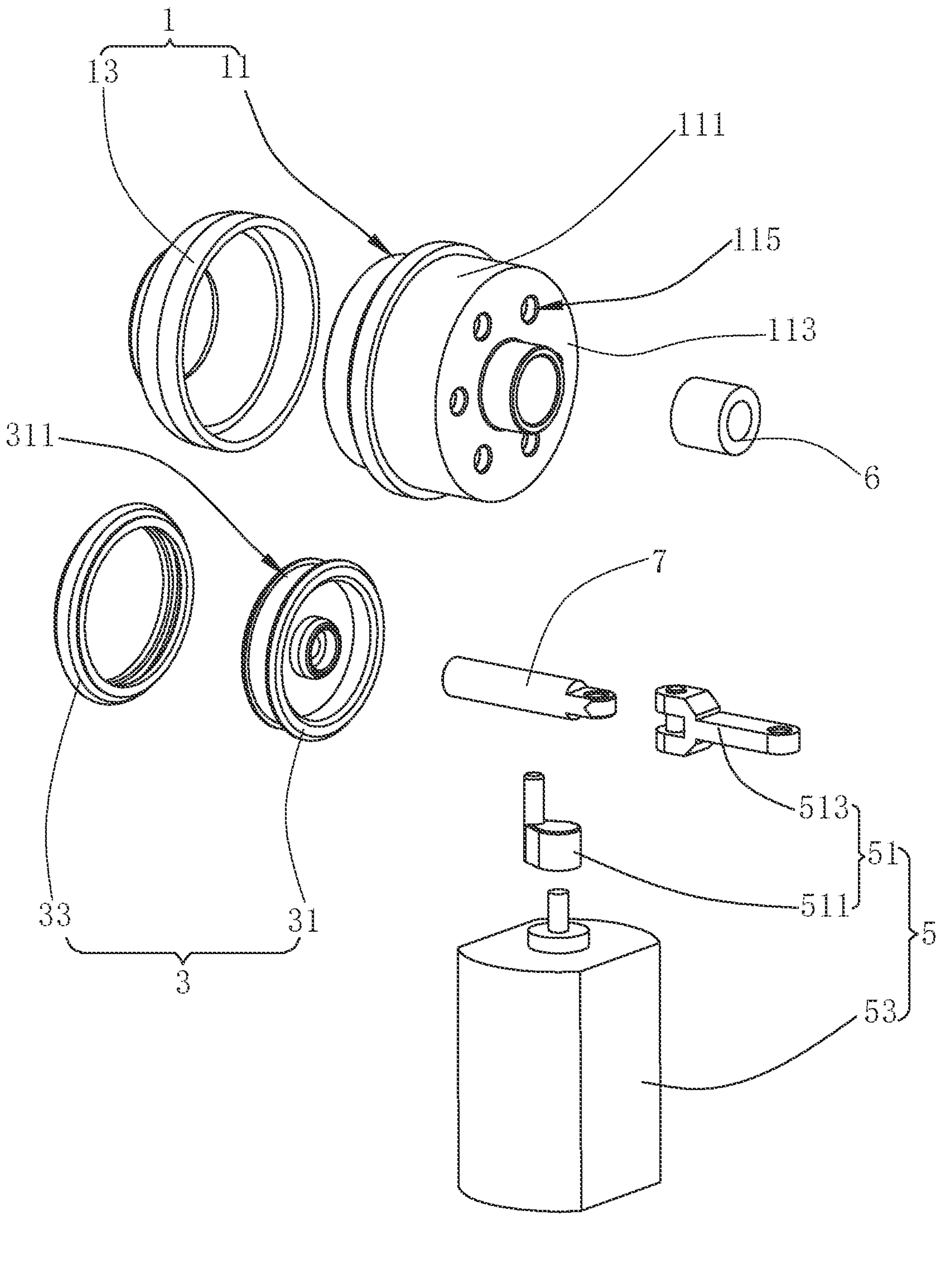
FIG. 1 is an exploded view of a negative pressure generator according to a first embodiment of the present disclosure.
Figure 2:
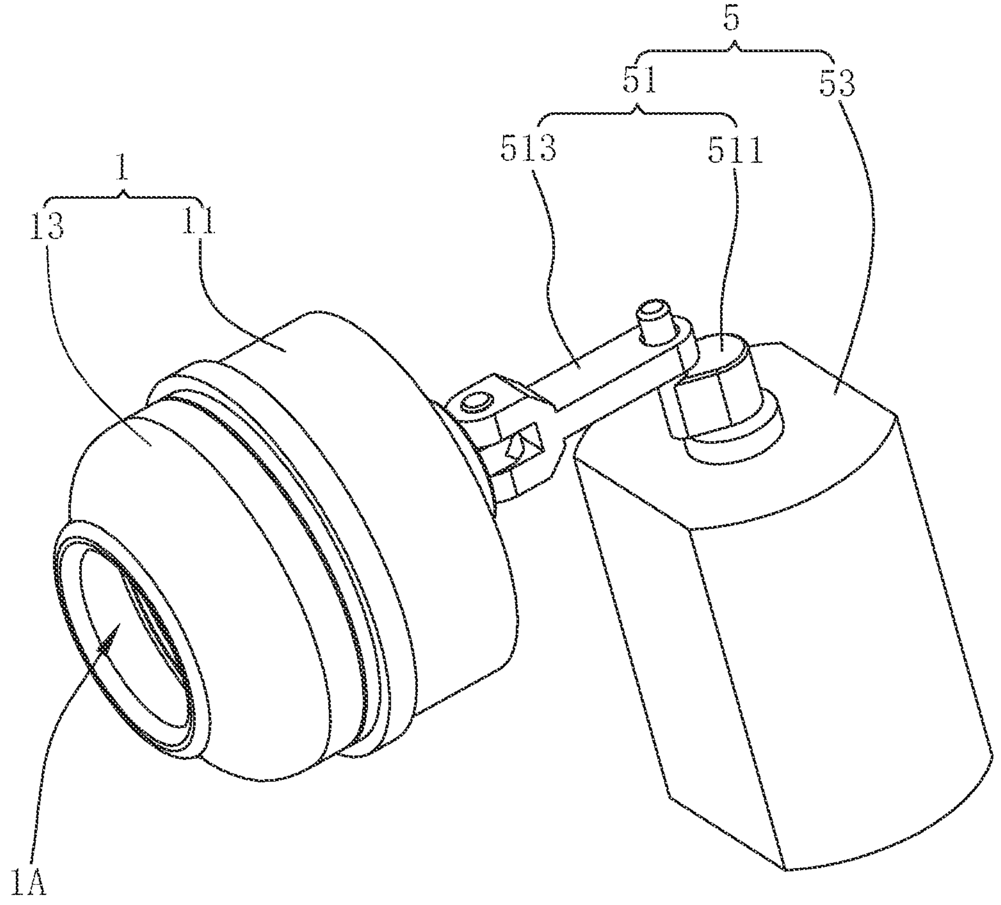
FIG. 2 is a schematic view of the negative pressure generator of FIG. 1 in an assembled state.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the invention, "a plurality of" means two or more, unless otherwise specifically defined.

Referring to FIGS. 1-4, a first embodiment of the present disclosure provides a negative pressure generator including a chamber body 1 with a suction nozzle 1A, a piston 3 arranged inside the chamber body 1, and a driving device 5 configured to drive the piston 3 to reciprocated move so as to generate negative pressure at the suction nozzle 1A. The piston 3 separates the chamber body 1 into a first chamber 1B and a second chamber 1C. The first chamber 1B communicates with the suction nozzle 1A. When in use, the suction nozzle 1A is attached to human body, and the driving device 5 drives the piston 3 to move away from the suction nozzle 1A so that a volume of the first chamber 1B is increased and negative pressure is generated at the suction nozzle 1A. Therefore, the suction nozzle 1A can be sucked onto the human body under the negative pressure.

The chamber body 1 includes a rigid part 11 with an opening 11A, and a flexible part 13. The piston 3 is arranged inside the rigid part 11. The flexible part 13 is connected to the rigid part 11 at the opening 11A. The suction nozzle 1A is formed on the flexible part 13. The flexible part 13 defines an air passage 13A communicating the opening 11A and the suction nozzle 1A. The suction nozzle 1A is formed at the end of the air passage 13A away from the opening 11A.

In at least one embodiment, the rigid part 11 and the flexible part 13 are integrally formed. It should be understood that, in at least one embodiment, the rigid part 11 and the flexible 13 are formed independently, and the flexible part 13 can be connected to the rigid part 11 by any suitable structures, such as adhesive glues.

Figure 3:
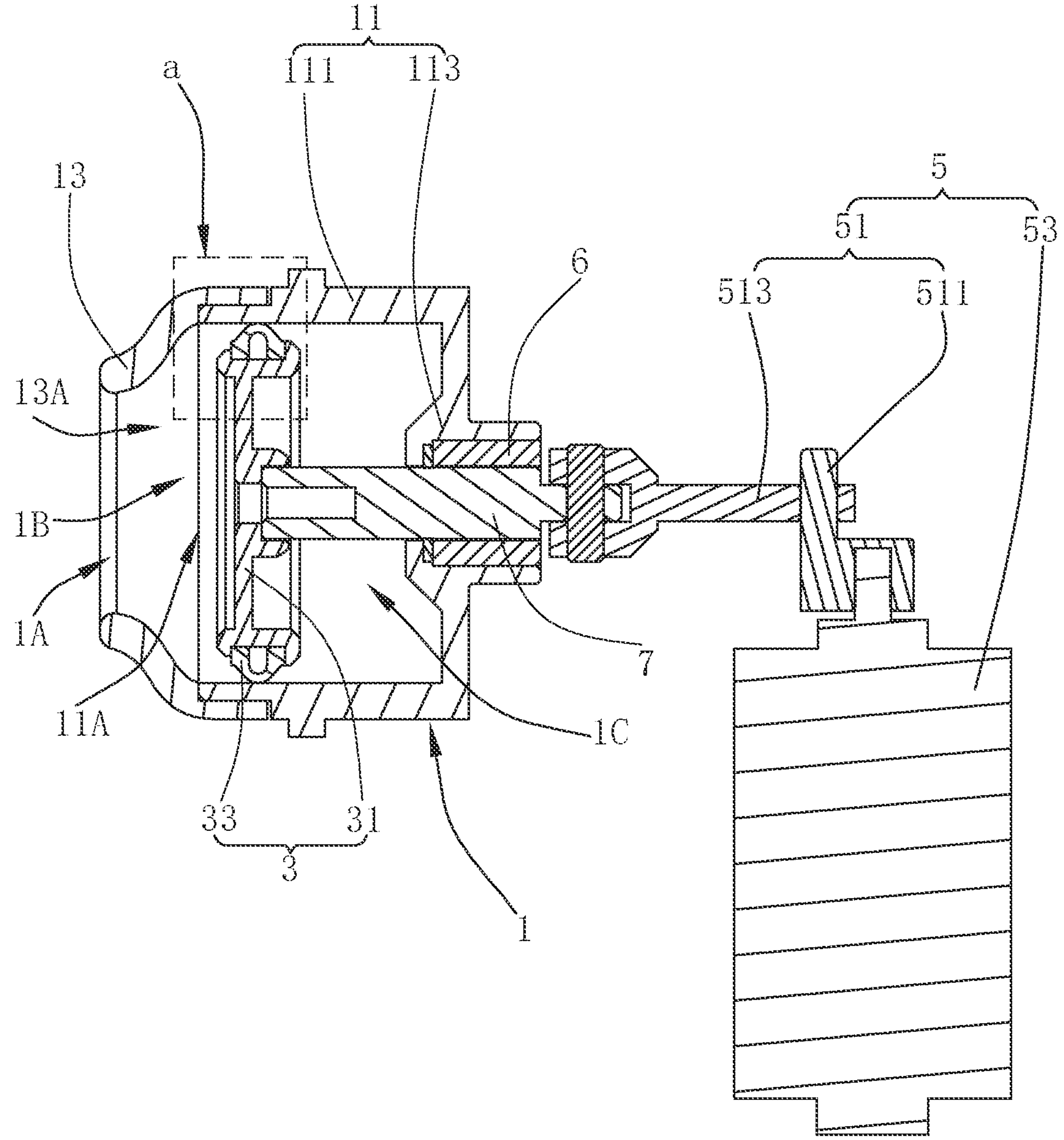
FIG. 3 is a cross-sectional view of the negative pressure generator of FIG. 2.

Referring to FIG. 3, the rigid part 11 includes a first wall 111 extending along a moving direction of the piston 3 and surrounding the opening 11A, and a second wall 113 connected to an end of the first wall 111 away from the opening 11A. A transmission member 7 movably extends through the second wall 113 and configured to connect the piston 3 with the driving device 5. The driving device 5 drives the transmission member 7 to move so as to bring the piston 3 to reciprocated move inside the chamber body 1.

Referring to FIG. 3, a self-lubricating sleeve 6 is arranged between the transmission member 7 and the second wall 113, so that the transmission member 7 movably extends through the second wall 113, which facilitates reducing a fiction between the transmission member 7 and the second wall 113 when the transmission member 7 moves relative the second wall 113.

In at least one embodiment, the second wall 113 defines at least one vent hole 115. Referring to FIG. 1, the number of the at least one vent hole 115 is multiple. In at least one embodiment, the least one vent hole 115 runs through the second wall 113. Through such arrangement, air can be vented outside of the chamber body 1 through the vent hole 115 when the piston 3 moves away from the suction nozzle 1A, therefore, resistance of the piston 3 moving away from the suction nozzle 1A is reduced.

The piston 3 includes a piston body 31, and a sealing ring 33 surrounding the piston body 31. The sealing ring 33 resists against between the piston body 31 and the first wall 111 to ensure sealing performance. Therefore, air if prevented from running between the first chamber 1B and the second chamber 1C.

The transmission member 7 is connected to the piston body 31, so that movement of the transmission 7 can bring the piston 3 to reciprocated move inside the chamber body 1.

In at least one embodiment, the piston body 31 defines a sealing slot 311 on an outer wall thereof, and the sealing ring 33 is at least partially arranged inside the sealing slot 311.

In at least one embodiment, the sealing ring 33 includes an arc-shaped portion 331 and two fixing portion 333 arranged two opposite sides of the arc-shaped portion 331 respectively. The arc-shaped portion 331 is spaced from the piston body 31. The two fixing portion 333 are arranged at interval along the moving direction of the piston 3 and extending toward sealing slot 311 and received in the sealing slot 311. The arc-shaped portion 331 together with the two fixing portions 333 and the piston body 31 defines a space 33A. The arc-shaped portion 331 can be deformed into the space 33A so as to avoid jam during reciprocated moving of the piston 3. It should be understood that, in at least one embodiment, the sealing ring 33 can be an O-shaped sealing ring, such as a traditional rubber sealing ring.

Figure 4:
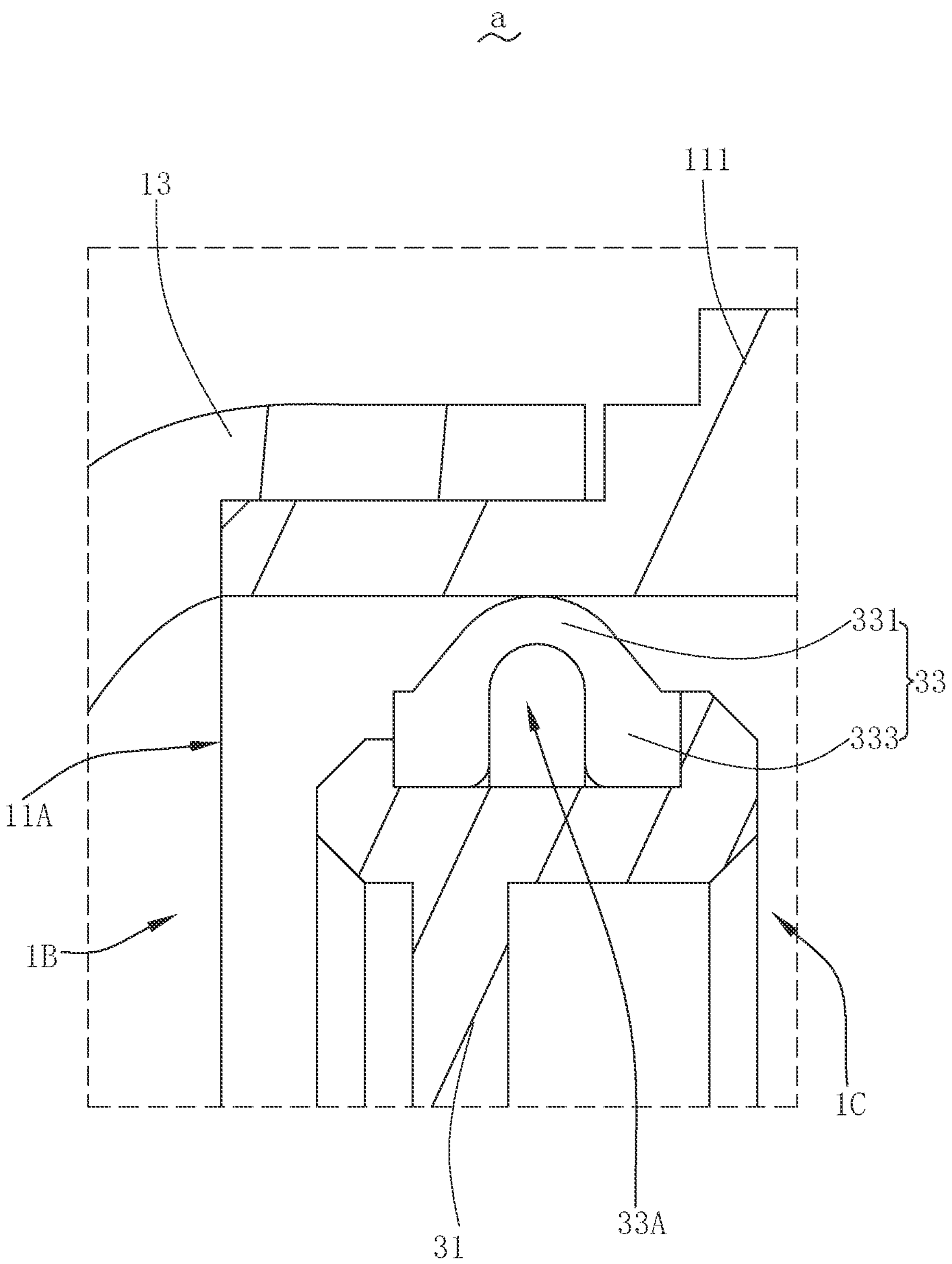
FIG. 4 is an enlarged view of a portion A shown in FIG. 3.

Referring to FIG. 4, in at least one embodiment, a center of curvature of the arc-shaped portion 331 is located at a position facing the space 33A, which facilitate deformation of the arc-shaped portion 331 to move into the space 33A.

The driving device 5 includes a transmission assembly 51 and a motor 53. The motor 53 is configured to be connected to the transmission member 7 through the transmission assembly 51. The transmission assembly 51 can be any one of an eccentric transmission structure, a cam and a ball screw.

In at least one embodiment, the transmission assembly 51 is an eccentric transmission structure and includes an eccentric element 511 and a connecting rod 513. The eccentric element 511 is connected to the motor 53, and the connecting rod 513 is hinged with the transmission member 7. When the negative pressure generator is in use, the motor 53 drives the piston 3 to reciprocated move inside the chamber body 1 through the eccentric element 511, the connecting rod 513 and the transmission member 7.

Figure 5:
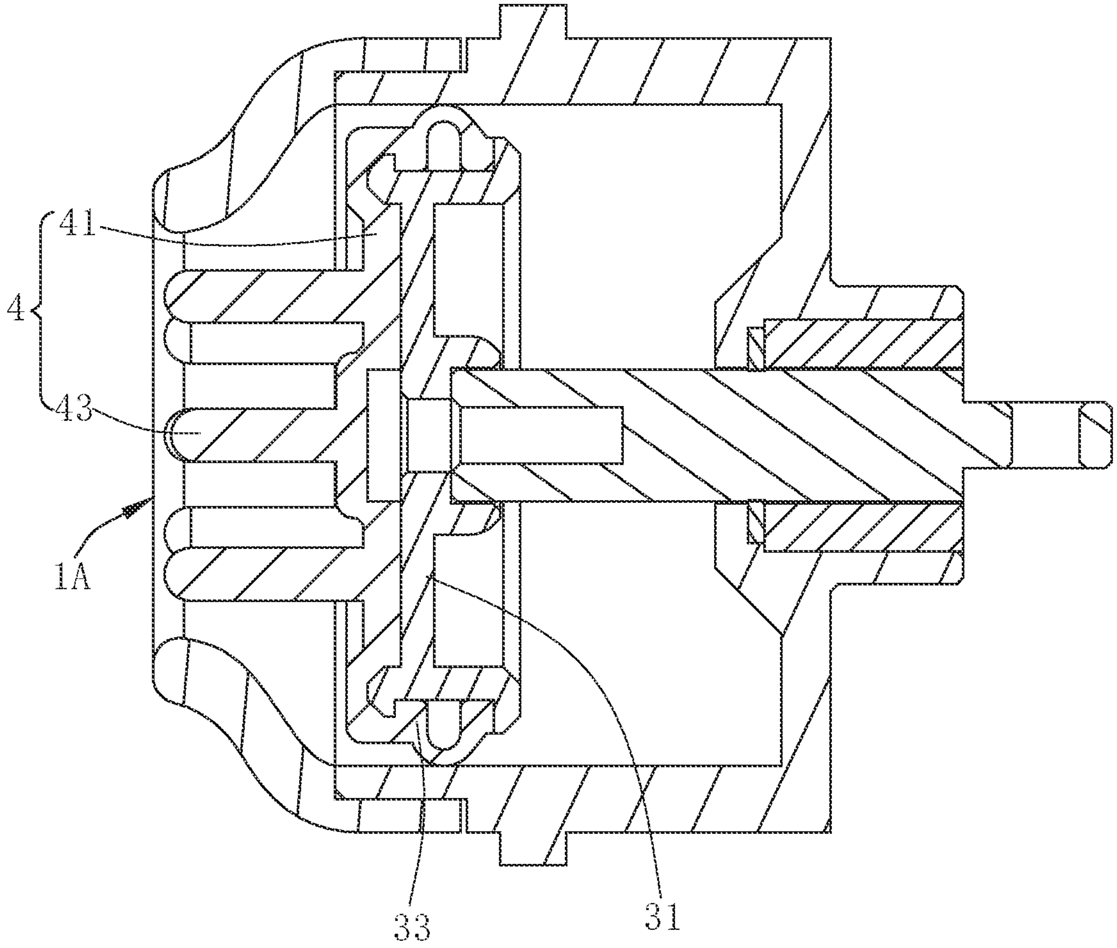
FIG. 5 is a schematic view of a part of a negative pressure generator according to a second embodiment of the present disclosure, the negative pressure generator including a massaging member and a sealing ring.
Figure 6:
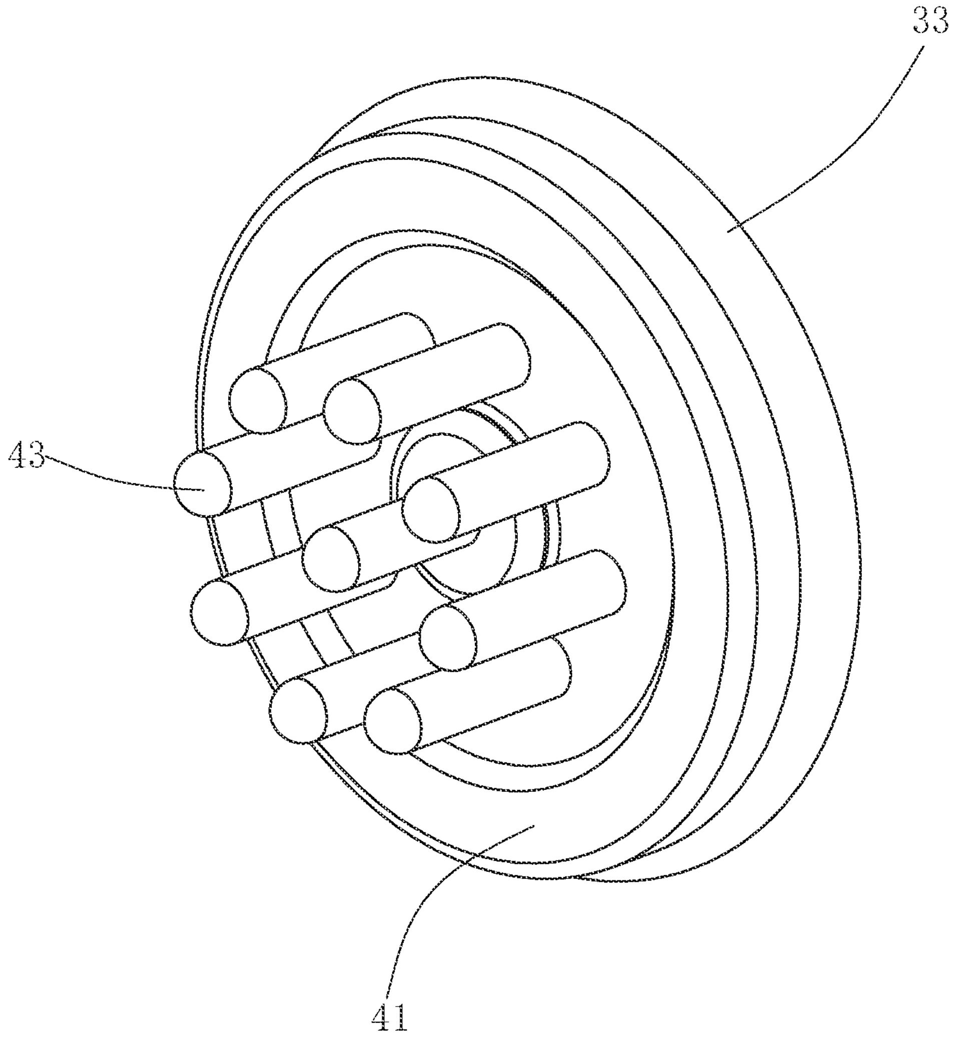
FIG. 6 is a schematic view of the massaging member and the sealing ring of FIG. 5.

Referring to FIGS. 5 and 6, a second embodiment of the present disclosure provides a negative pressure generator. The difference between the negative pressure generator of the second embodiment and the negative pressure generator of the first embodiment is that the negative pressure generator of the second embodiment further includes a massaging member 4. The massaging member 4 includes a connecting part 41 connected to a side of the piston body 31 of the piston 3 facing the suction nozzle 1A and a massaging part 43 extending away from the connecting part 41. The massaging part 43 partially extends out of the chamber body 1 through the suction nozzle 1A. In at least one embodiment, when the piston 3 moves to a first direction closest to the suction nozzle 1A, the massaging part 43 at least partially extends out of the chamber body 1 so as to massage human body, thus improving user experience.

In at least one embodiment, the massaging member 4 and the sealing ring 33 are integrally formed. A periphery of the connecting part 41 is connected with the sealing ring 33. It should be understood that, in at least one embodiment, the massaging member 4 and the sealing ring 33 can be two independent components and the massaging member 4 can be connected to the piston body 31 of the piston 3 with any suitable structures, such as adhesive glues.

Referring to FIGS. 7-10, a third embodiment of the present disclosure provides a negative pressure generator. The difference between the negative pressure generator of the third embodiment and the negative pressure generator of the first embodiment is the piston 3'. The difference between the piston 3 and the piston 3' is that, the piston 3' further includes a unidirectional exhaust structure 35 communicating with the first chamber 1B and the second chamber 1C. When the piston 3' moves towards the suction nozzle 1A, the unidirectional exhaust structure 35 communicates the first chamber 1B with the second chamber 1C under air pressure of the first chamber 1B; when the piston 3' moves away from the suction nozzle 1A, the unidirectional exhaust structure 35 blocks communication between the first chamber 1B and the second chamber 1C under air pressure of the second chamber 1C. By setting the unidirectional exhaust structure 35, when the piston 3' moves away from the suction nozzle 1A, negative pressure is generated at the suction nozzle 1A; when the piston 3' moves towards the suction nozzle 1A, air in the first chamber 1B can exhaust to the second chamber 1C through the unidirectional exhaust structure 35, and the second chamber 1C communicates with the outside, thus, the resistance during movement of the piston 3' can be reduced.

The unidirectional exhaust structure 35 includes at least one exhaust hole 351 running through the piston body 31 of the piston 3' to communicate the first chamber 1B with the second chamber 1C, and a vent plug 353 arranged on a side of the piston body 31 of the piston 3' away from the first chamber 1B and configured to cover the at least one exhaust hole 351. When the piston 3' moves towards the suction nozzle 1A, the vent plug 353 moves to open the exhaust hole 351 so that the first chamber 1B communicates with the second chamber 1C through the exhaust hole 351 under air pressure of the first chamber 1B. When the piston 3' moves away from the suction nozzle 1A, the vent plug 353 blocks communication between the first chamber 1B and the second chamber 1C under air pressure of the second chamber 1C.

Figure 8:
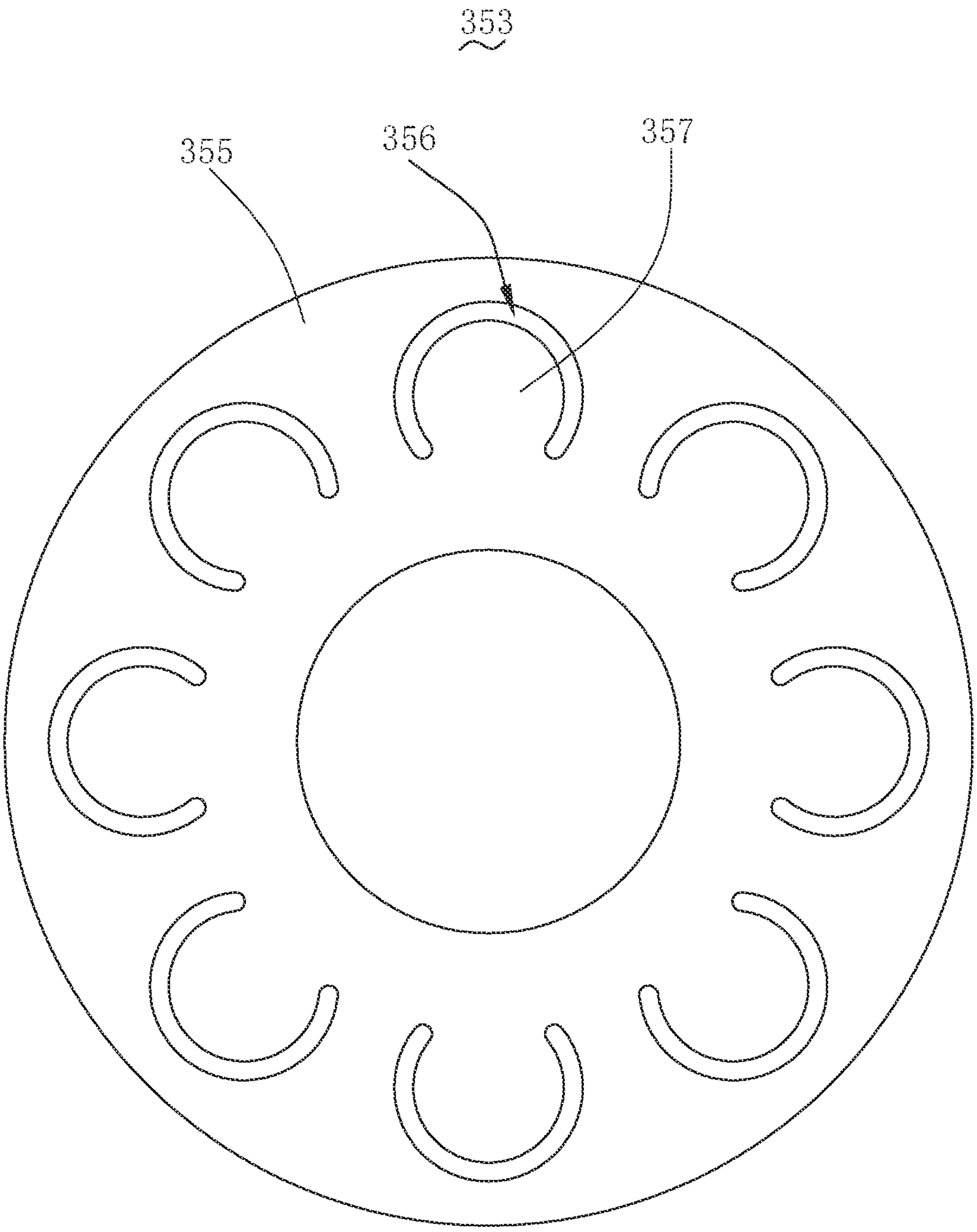
FIG. 8 is a schematic view of the vent plug of FIG. 7.
Figure 9:
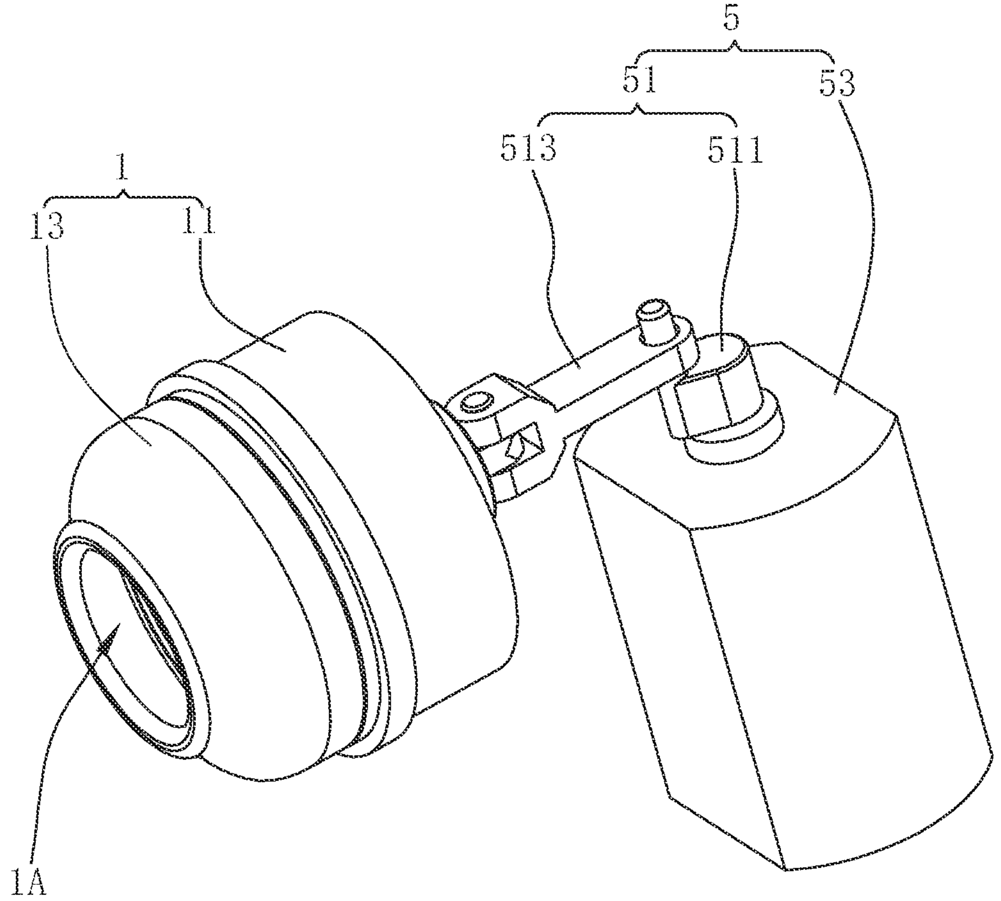
FIG. 9 is a schematic view of the negative pressure generator of FIG. 7 in an assembled state.
Figure 10:
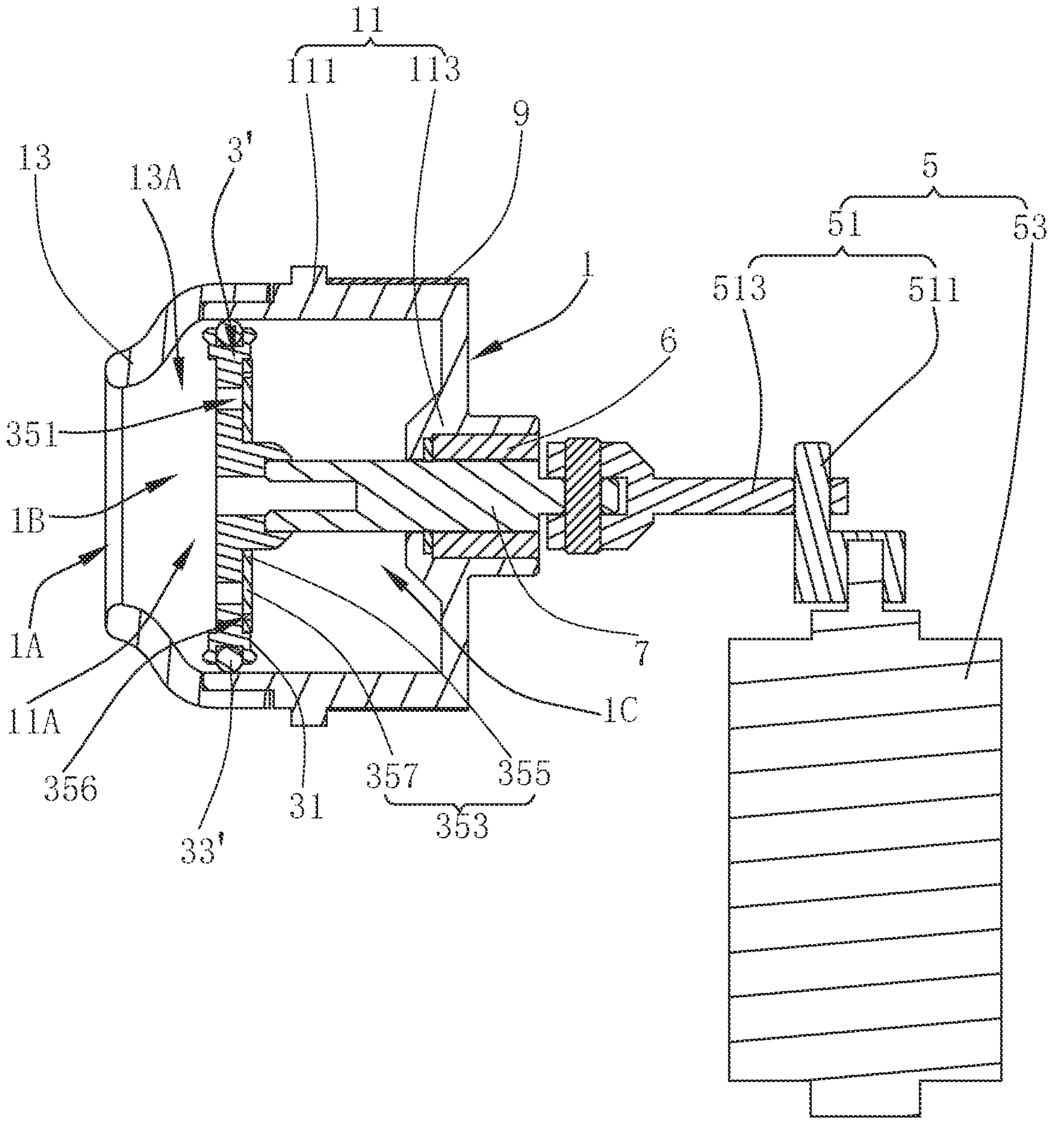
FIG. 10 is a cross-sectional view of the negative pressure generator of FIG. 9.

Referring to FIGS. 8 and 10, the vent plug 353 is an annular sheet. In at least one embodiment, the vent plug 353 can be deformed. For example, the vent plug 353 can be made of silicon material to make the vent plug 353 flexible and soft. In detail, referring to FIG. 8, the vent plug 353 includes a main part 355 arranged on the side of the piston body 31 of the piston 3' away from the suction nozzle 1A and at least one covering part 357 configured to cover the at least one exhaust hole 351. The main part 355 defines at least one through hole 356. The covering part 357 extends from the main part 355 into the at least one through hole 356 respectively. In at least one embodiment, the covering part 357 can move relative to the main part 355.

When the piston 3' moves away from the suction nozzle 1A, the volume of the first chamber 1B is increased to decrease the air pressure in the first chamber 1B, therefore, negative pressure is generated at the suction nozzle 1A to generate a suction force applied on human body. At the same time, the covering part 357 covers the at least one exhaust hole 351 to block communication between the first chamber 1B and the second chamber 1*c* under the negative pressure. With the volume of the first chamber 1B getting bigger, the negative pressure getting bigger, which forces the covering part 357 to remain covering the at least one exhaust hole 351 to keep blocking communication between the first chamber 1B and the second chamber 1C. Therefore, the suction nozzle 1A remains at a suction state.

When the piston 3' moves towards the suction nozzle 1A, the volume of the first chamber 1B is decreased to decrease the negative pressure. The piston 3' compresses air in the first chamber 1B to increase air pressure in the first chamber 1B. When a difference between the air pressure in the first chamber 1B and the air pressure in the second chamber 1C is greater enough to make the covering part 357 deformed to open the at least one exhaust hole 351, air is vented from the first chamber 1B to the second chamber 1C to reduce movement resistance of the piston 3'.

In at least one embodiment, the main part 355 can be connected to the piston body 31 of the piston 3' by adhesive glues.

Figure 7:
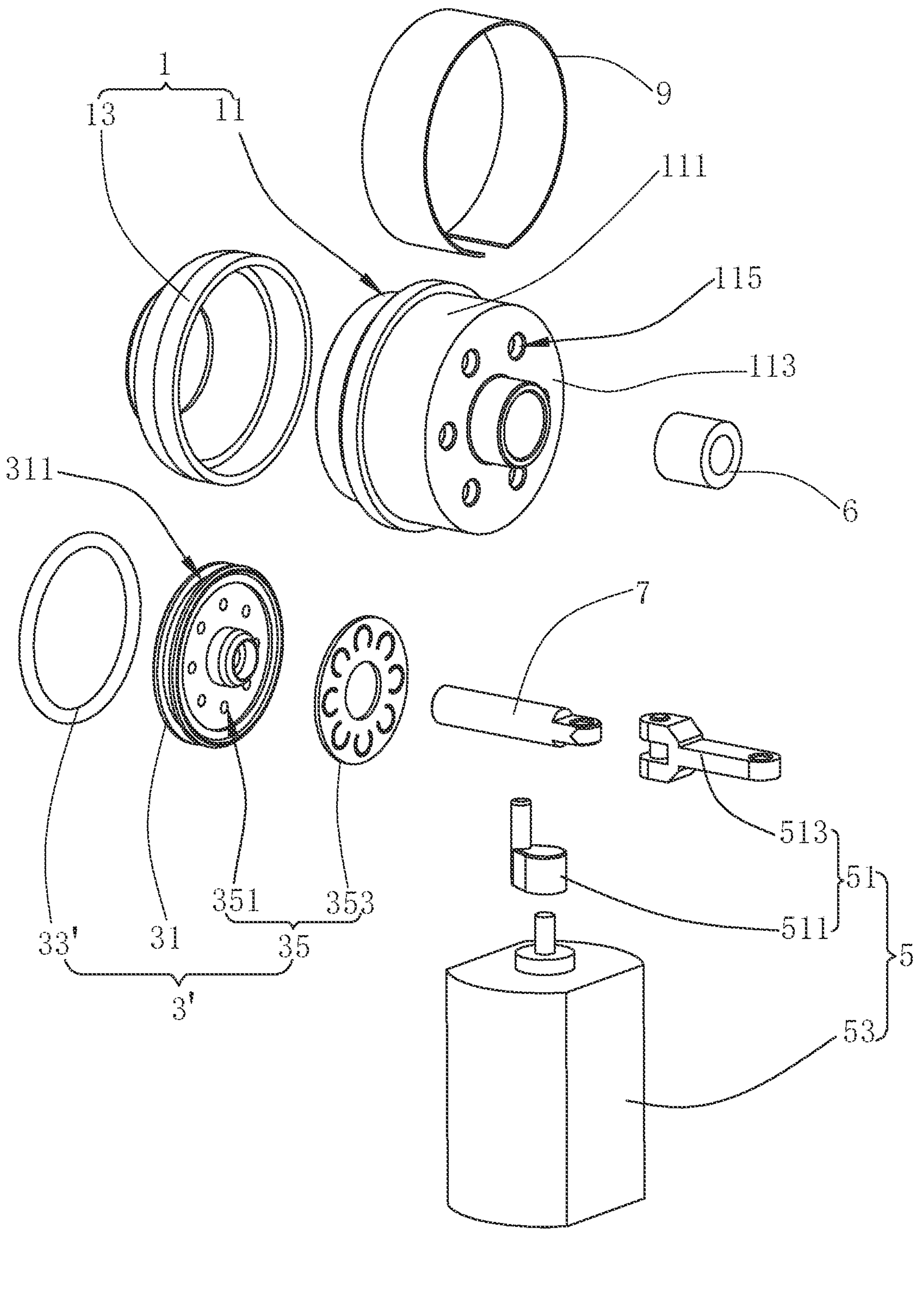
FIG. 7 is a schematic view of a negative pressure generator according to a third embodiment of the present disclosure, the negative pressure generator including a vent plug.

In at least one embodiment, referring to FIGS. 7 and 8, the number of the at least one exhaust hole 351 is multiple. Correspondingly, the number of the at least one through hole 356 and the number of the at least one covering part 357 are multiple.

Figure 11:
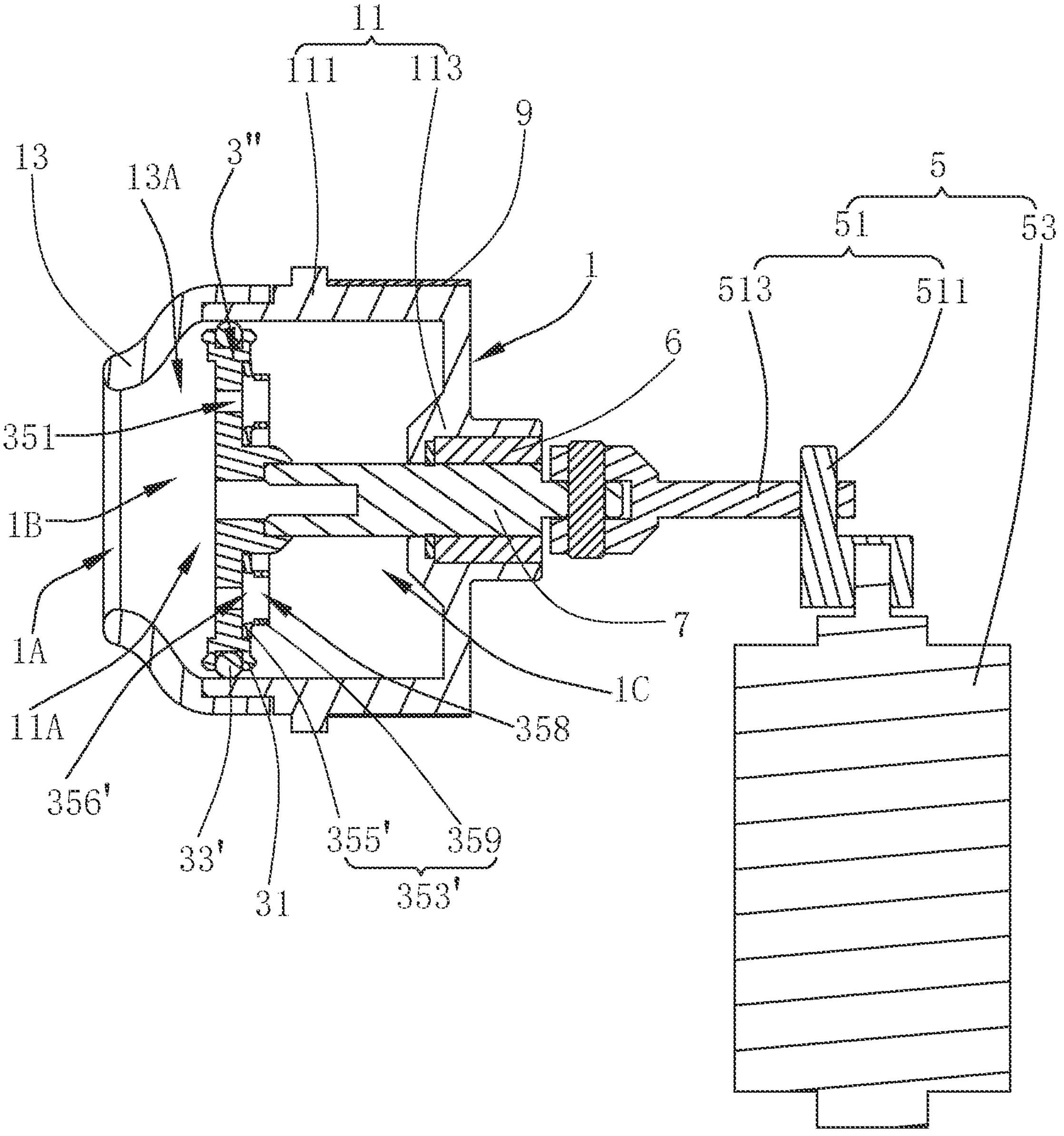
FIG. 11 is a schematic view of a negative pressure generator according to a fourth embodiment of the present disclosure, the negative pressure generator including a vent plug.

In at least one embodiment, referring to FIGS. 10-11, a heating coil 9 or a semiconductor refrigeration sheet 9 is arranged on the rigid part 11. In detail, the heating coil 9 or the semiconductor refrigeration sheet 9 are arranged on an outer side of the first wall 111. In at least one embodiment, the semiconductor refrigeration sheet 9 includes a hot end and a cold end opposite to the hot end. The hot end or the cold end can be attached to the first wall 111 so as to adjust temperature of the flexible part 13, thereby improving user's experiences. It should be understood that, in at least one embodiment, the semiconductor refrigeration sheet 9 can be replaced with the heating coil 9.

The sealing ring 33' can be a general O-shaped sealing ring, such as a rubber sealing ring. It should be understood that, in at least one embodiment, the sealing ring 33' can be the sealing ring 33 described in the first embodiment. That is, the sealing ring 33' can include the arc-shaped portion 331 and two fixing portion 333 arranged two opposite sides of the arc-shaped portion 331 respectively. The two fixing portion 333 are arranged at interval along the moving direction of the piston and extending toward sealing slot 311 and received in the sealing slot 311 and received in the sealing slot 311. The arc-shaped portion 331 together with the two fixing portions 333 and the piston body 31 defines a space 33A. The arc-shaped portion 331 can be deformed into the space 33A.

Figure 12:
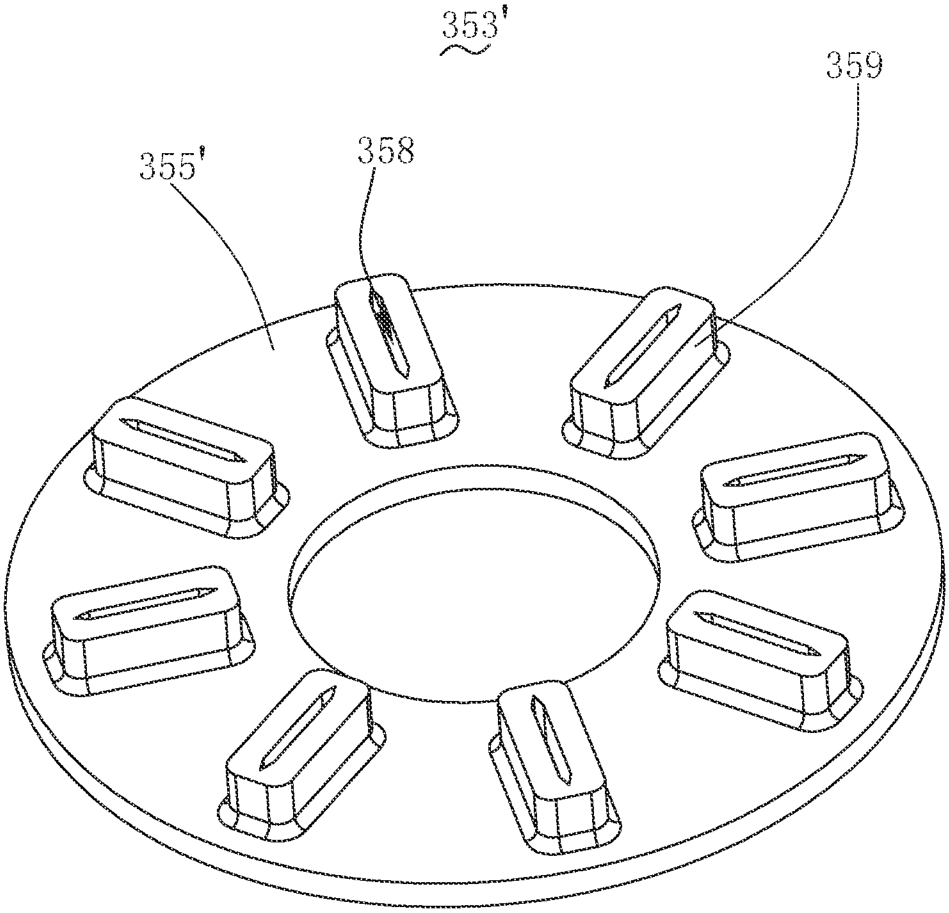
FIG. 12 is a schematic view of the vent plug of FIG. 11.
Figure 13:
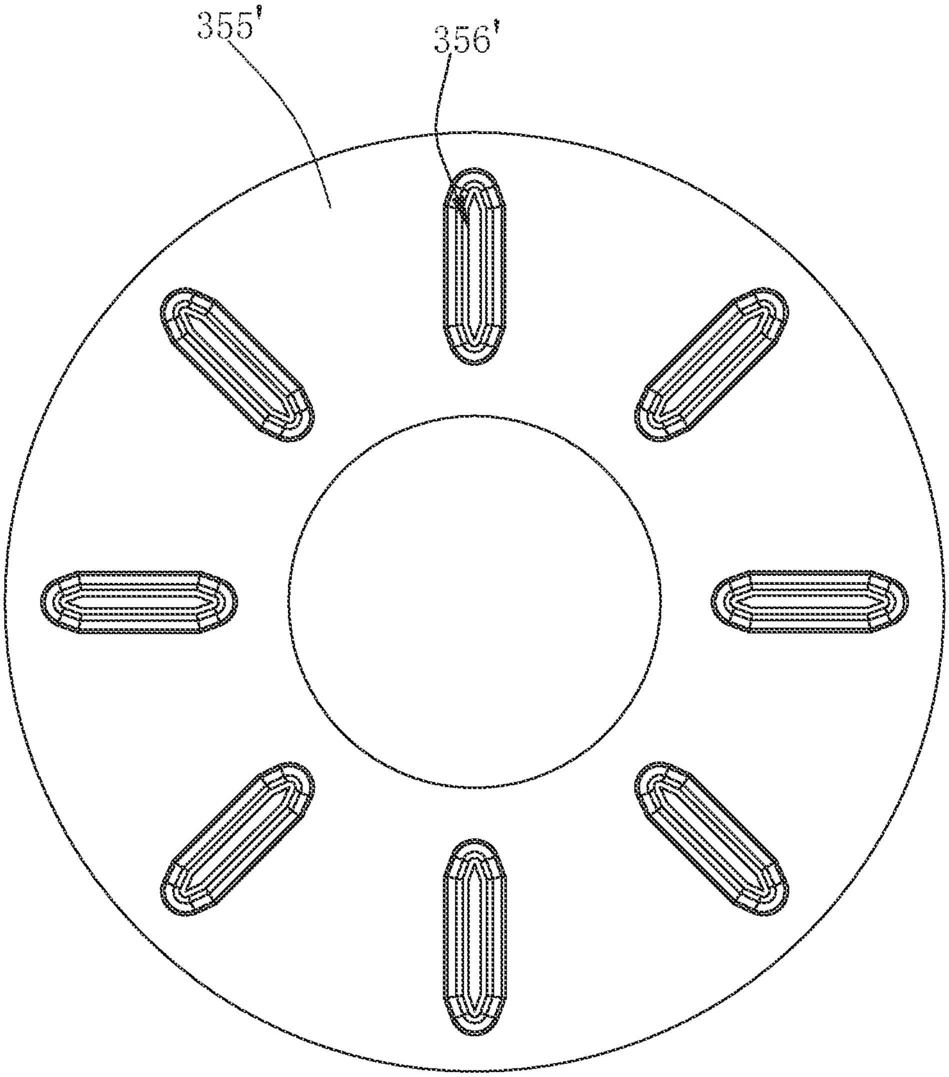
FIG. 13 is a bottom plan view of the vent plug of FIG. 12.

Referring to FIGS. 11-13, a fourth embodiment of the present disclosure provides a negative pressure generator. The difference between the negative pressure generator of the fourth embodiment and the negative pressure generator of the third embodiment is that a structure of the vent plug 353' is different from that of the vent plug 353. The vent plug 353' includes a main part 355' arranged on the side of the piston body 31 of the piston 3' away from the suction nozzle 1A and at least one surrounding wall 359 extending away from the main part 355'. The main part 355' defines at least one through hole 356' corresponding to the at least one exhaust hole 351. The through holes 356' communicate with the exhaust holes 351. The at least one surrounding wall 359 surrounds the at least one exhaust hole 356' respectively, and extends toward the second chamber 1C. Each of the at least one surrounding wall 359 defines an air channel 358 communicating with a corresponding the exhaust hole 356'. The surrounding wall 359 is made of elastic material and configured to be deformed to open or close (or substantially close) the air channel 358.

When the piston 3" moves away from the suction nozzle 1A, the volume of the first chamber 1B is increased to decrease the air pressure in the first chamber 1B, therefore, negative pressure is generated at the suction nozzle 1A to generate a suction force applied on human body. At the same time, the surrounding wall 359 closes to block communication between the first chamber 1B and the second chamber 1C under the negative pressure. With the volume of the first chamber 1B getting bigger, the negative pressure getting bigger, which forces the surrounding wall 359 to remain blocking communication between the first chamber 1B and the second chamber 1C. Therefore, the suction nozzle 1A remains at the suction state.

When the piston 3" moves toward the suction nozzle 1A, the volume of the first chamber 1B is decreased to decrease the negative pressure. The piston 3" compresses air in the first chamber 1B to increase air pressure in the first chamber 1B. When a difference between the air pressure in the first chamber 1B and the air pressure in the second chamber 1C is greater enough to make the surrounding wall 359 deformed to open the air channel 358. The at least one air channel 358 communicates the first chamber 1B through the at least one through holes 356 and the at least one exhaust hole 351 with the second chamber 1C, therefore, air can be vented from the first chamber 1B to the second chamber 1C to reduce movement resistance of the piston 3".

It should be understood that, the unidirectional exhaust structure of the present disclosure is not limited to the unidirectional exhaust structure 35 described in the third embodiment and the fourth embodiment. For example, the unidirectional exhaust structure 35 can be a one-way valve extending through the piston body 31. The vent plug 353, 353' can be a flat plate structure made of rigid material, and the vent plug can be connected to the piston body 31 through a spring. When the air pressure in the first chamber 1B is greater enough to make the spring deformed to open the exhaust hole 351. When the piston 3 moves away from the suction nozzle 1A, the volume of the first chamber 1B gets bigger to decrease the air pressure in the first chamber 1B, the vent plug 35 blocks the exhaust hole 351 to block communication between the first chamber 1B and the second chamber 1C. Along with the volume of the first chamber 1B gets bigger, the negative pressure gets bigger, which forces the vent plug 35 to remain blocking the exhaust hole 351.

Figure 14:
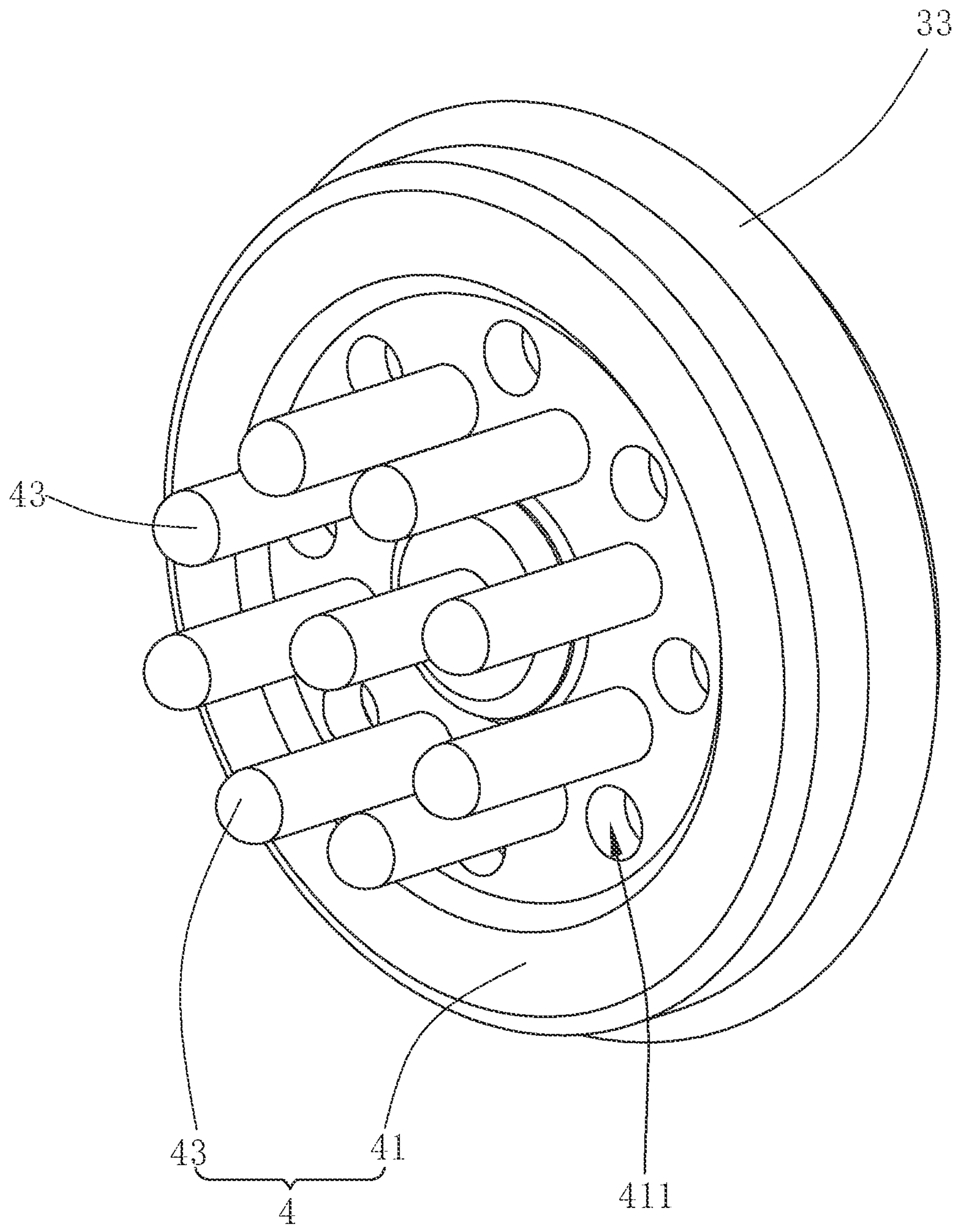
FIG. 14 is a schematic view of a massaging member and a sealing ring of a negative pressure generator according to an embodiment of the present disclosure.

The negative pressure generator with the unidirectional exhaust structure is not limited to the negative pressure generator shown in the third and fourth embodiments. Referring to FIG. 14, the negative pressure generator with the unidirectional exhaust structure can further includes the massaging member 4 shown in FIG. 5. The massaging member 4 includes the connecting part 41 connected to a side of the piston body 31 of the piston 3 facing the suction nozzle 1A and the massaging part 43 extending away from the connecting part 41. The massaging part 43 is configured to be capable of at least partially extending out of the chamber body 1 through the suction nozzle 1A. In order to make the first chamber 1B and the second chamber 1C communicate with each other, the connecting part 41 defines at least one air hole 411 communicating with the at least one exhaust hole 351. Additionally, referring to FIG. 14, the massaging member 4 can be integrally formed with the sealing ring 33 with an outer edge of the connecting part 41 connected with the sealing ring 33.

It should be understood that, the driving device is not limited to the driving device 5 shown in the first to fourth embodiments. For example, the driving device can be an electromagnetic driver. The electromagnetic driver includes a first magnetic component and a second magnetic component connected to the transmission member. One of the first magnetic component and the second magnetic component is a coil, and the other one of the first magnetic component and the second magnetic component is a magnet. When the coil is energized, interaction force between the first magnetic component and the second magnetic component can drive the piston to reciprocated move.

The magnet can be a permanent magnet or an electromagnet.

Figure 15:
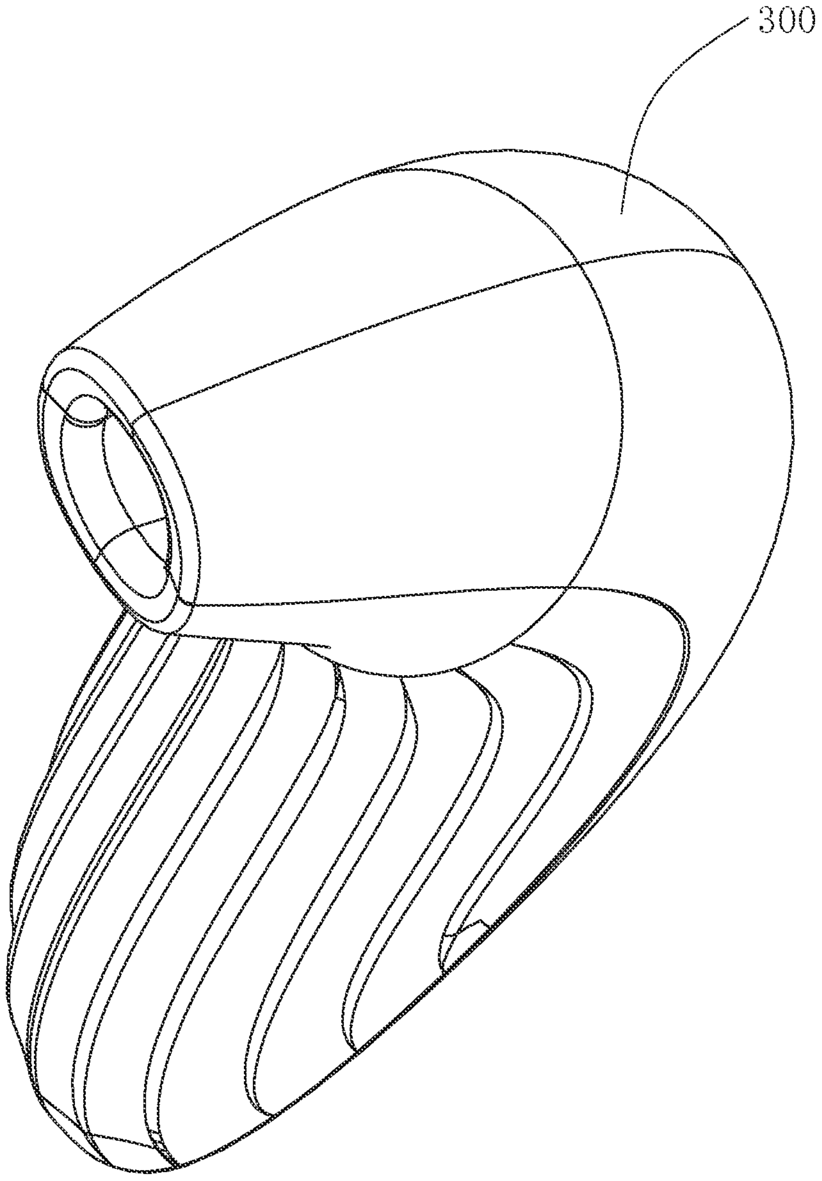
FIG. 15 is a schematic view of a negative pressure massaging device according to an embodiment of the present disclosure.
Figure 16:
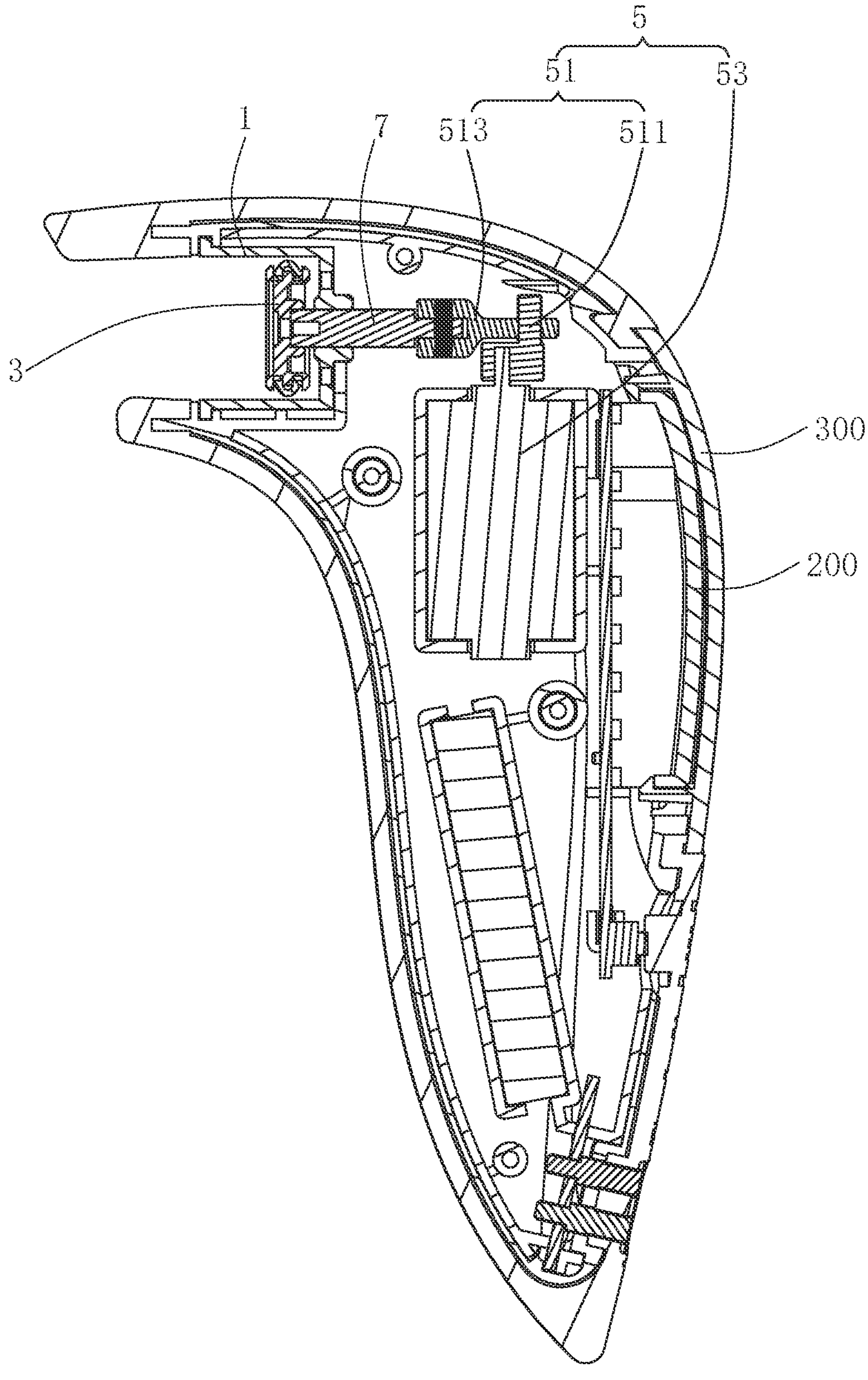
FIG. 16 is a cross-sectional view of the negative pressure massaging device shown in FIG. 15.

Referring to FIG. 15 and FIG. 16, the present disclosure further provides a negative pressure massaging device including the negative pressure generator described in the embodiments. In at least one embodiment, the negative pressure massaging device includes, a housing 300, 200; a chamber body 1 with a suction nozzle; a piston 3, arranged inside the chamber body 1; a driving device 5, configured to drive the piston 3 to reciprocated move inside the chamber body 1 so as to generate negative pressure at the suction nozzle; wherein the chamber body 1 and the driving device 5 are received in the housing 300, 200. The housing includes a support housing 200 and a silica gel 300 covered on the support housing 200.

In at least one embodiment, the piston includes a piston body configured to separate the chamber body into a first chamber and a second chamber and a sealing ring arranged between the chamber body and the piston body, the massaging member includes a connecting part connected to a side of the piston body facing the suction nozzle, and at least one massaging part arranged on the connecting part away from the piston body.

In at least one embodiment, the massaging member is integrally formed with the sealing ring.

In at least one embodiment, the negative pressure massaging device further includes a unidirectional exhaust structure (for example the unidirectional exhaust structure 35 or 35'), wherein unidirectional exhaust structure includes at least one exhaust hole extending through the piston body to communicate the first chamber and the second chamber, and a vent plug (for example the vent plug 353 or 353') configured to unidirectionally open the exhaust hole to communicate the first chamber with the second chamber, the connecting part defines at least one air hole communicating with the at least one exhaust hole.

The negative pressure generator and the negative pressure massaging device introduce the piston inside the chamber body and a driving device to drive the piston to reciprocate inside the chamber body so as to generate negative pressure at the suction nozzle, thereby improving suctioning effect. The unidirectional exhaust structure can facilitate reducing moving resistance of the piston, thereby improving user experience.

The above description only describes embodiments of the present disclosure, and is not intended to limit the present disclosure, various modifications and changes can be made to the present disclosure. Any modifications, equivalent substitutions, improvements, etc. made within the spirit and scope of the present disclosure are intended to be included within the scope of the present disclosure.

What is claimed is:

1. A negative pressure generator, comprising:

a chamber body with a suction nozzle;

a piston, arranged inside the chamber body; and a driving device, configured to drive the piston to reciprocate inside the chamber body so as to generate negative pressure at the suction nozzle, wherein the piston comprises a piston body and a sealing ring arranged between the chamber body and the piston body, the sealing ring surrounding the piston body and between the piston body and the chamber body to ensure sealing performance, wherein the piston separates the chamber body into a first chamber and a second chamber, the first chamber communicates with the suction nozzle, the piston further comprises a unidirectional exhaust structure configured to fluidly communicate the first chamber with the second chamber unidirectionally, wherein the unidirectional exhaust structure comprises at least one exhaust hole extending through the piston body to communicate the first chamber with the second chamber, and a vent plug arranged on the piston body and configured to cover the at least one exhaust hole away from the first chamber, the vent plug comprises a main part arranged on the piston body away from the suction nozzle, and at least one covering part made of elastic material which is capable of being deformed to cover or open the at least one exhaust hole.

2. The negative pressure generator according to claim 1, wherein the piston body defines sealing slot configured to receive the sealing ring.

3. The negative pressure generator according to claim 2, wherein the sealing ring comprises an arc-shaped part and two fixing parts extending from two opposite sides of the arc-shaped part respectively, wherein the two fixing parts arranged at interval along a moving direction of the piston and extending toward the sealing ring, the arc-shaped part, the two fixing parts and the piston body cooperate to define a space, and the arc-shaped part is configured to be deformed into the space.

4. The negative pressure generator according to claim 1, further comprising a massaging member, the massaging member comprising a connecting part connected to a side of the piston body facing the suction nozzle, and at least one massaging part arranged on the connecting part away from the piston body and configured to partially extend out of the chamber body through the suction nozzle.

5. The negative pressure generator according to claim 4, wherein, the massaging member is integrally formed with the sealing ring, an outside edge of the connecting part is connected to the sealing ring.

6. The negative pressure generator according to claim 1, wherein the vent plug comprises a main part arranged on the piston body away from the suction nozzle, and at least one surrounding wall extending away from the main part, the main part defines at least one through hole communicating with the at least one exhaust hole, the at least one surrounding wall surrounds the at least one through hole respectively and is made of elastic material which is capable of being deformed to close or open the at least one through hole.

7. The negative pressure generator according to claim 1, wherein the chamber body comprises a rigid part with an opening and a flexible part, the piston is arranged inside the rigid part, the flexible part is connected to the rigid part at the opening and defines an air passage communicating with the opening, the suction nozzle is arranged on the flexible part away from the opening.

8. The negative pressure generator according to claim 7, wherein the rigid part comprises a first wall extending along a moving direction of the piston and a second wall arranged at an end of the first wall away from the opening, a transmission member movably extends through the second wall to connect the piston to the driving device.

9. The negative pressure generator according to claim 8, wherein the second wall defines at least one vent hole extending therethrough.

10. The negative pressure generator according to claim 8, further comprises a self-lubricating sleeve arranged between the transmission member and the second wall.

11. The negative pressure generator according to claim 8, wherein the driving device comprises a transmission assembly and a motor, the motor is connected to the transmission member through the transmission assembly, the transmission assembly is one of an eccentric structure, a cam and a ball screw.

12. The negative pressure generator according to claim 8, wherein the transmission assembly comprises an eccentric element and a connecting rod, the eccentric element is connected to the motor, and the connecting rod is hinged with the transmission member.

13. The negative pressure generator according to claim 8, wherein the driving device is an electromagnetic motor.

14. The negative pressure generator according to claim 1, further comprising a heating coil or a semiconductor refrigeration sheet arranged on the chamber body to adjust temperature at the suction nozzle.

15. A negative pressure massaging device, comprising:

a housing:

a chamber body with a suction nozzle and received in the housing;

a piston, arranged inside the chamber body; and a driving device, configured to drive the piston to reciprocate inside the chamber body so as to generate negative pressure at the suction nozzle, wherein the piston comprises a piston body and a sealing ring arranged between the chamber body and the piston body, the sealing ring surrounding the piston body and between the piston body and the chamber body to ensure sealing performance, wherein the piston separates the chamber body into a first chamber and a second chamber, the first chamber communicates with the suction nozzle, the piston further comprises a unidirectional exhaust structure configured to fluidly communicate the first chamber with the second chamber unidirectionally, wherein the unidirectional exhaust structure comprises at least one exhaust hole extending through the piston body to communicate the first chamber with the second chamber, and a vent plug arranged on the piston body and configured to cover the at least one exhaust hole away from the first chamber, the vent plug comprises a main part arranged on the piston body away from the suction nozzle, and at least one covering part made of elastic material which is capable of being deformed to cover or open the at least one exhaust hole.

* * * * *